(12) United States Patent
Okuda et al.

(10) Patent No.: US 11,292,551 B2
(45) Date of Patent: Apr. 5, 2022

(54) METHOD FOR PRODUCING HANDLE PIPE FOR STRADDLED VEHICLE

(71) Applicant: YAMAHA HATSUDOKI KABUSHIKI KAISHA, Iwata (JP)

(72) Inventors: Yuya Okuda, Iwata (JP); Yuki Murayama, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 163 days.

(21) Appl. No.: 16/815,465

(22) Filed: Mar. 11, 2020

(65) Prior Publication Data

US 2020/0207438 A1 Jul. 2, 2020

Related U.S. Application Data

(62) Division of application No. 16/001,303, filed on Jun. 6, 2018, now Pat. No. 10,807,674.

(30) Foreign Application Priority Data

Jun. 9, 2017 (JP) .............................. JP2017-114742

(51) Int. Cl.
*B62K 21/12* (2006.01)
*B62K 21/26* (2006.01)
(Continued)

(52) U.S. Cl.
CPC ................ *B62K 21/12* (2013.01); *B21D 7/02* (2013.01); *B21D 53/86* (2013.01); *B62K 21/26* (2013.01)

(58) Field of Classification Search
CPC ........ B62K 21/12; B62K 21/26; B21D 53/86; B21D 7/02; B23P 13/02
See application file for complete search history.

(56) References Cited

U.S. PATENT DOCUMENTS

| 5,117,708 A | 6/1992 | Boyer et al. |
| 5,257,552 A | 11/1993 | Boyer et al. |

(Continued)

FOREIGN PATENT DOCUMENTS

| GB | 2402659 A | 12/2004 |
| JP | S60-49090 U | 4/1985 |

(Continued)

OTHER PUBLICATIONS

Define non-iron metal—Google Search, Feb. 27, 2020 (Year: 2020).

*Primary Examiner* — Vinh Luong
(74) *Attorney, Agent, or Firm* — Rabin & Berdo, P.C.

(57) ABSTRACT

A handle includes handle grips and a handle pipe including an attachment portion, a first grip portion, a second grip portion, a first bent portion between the attachment portion and the first grip portion, and a second bent portion between the attachment portion and the second grip portion. The first grip portion includes a first overlapping region overlapping a first handle grip and a first non-overlapping region not overlapping the first handle grip. The second grip portion includes a second overlapping region overlapping a second handle grip and a second non-overlapping region not overlapping the second handle grip. The first and second non-overlapping regions each include a thick portion having a thickness larger than, or equal to, a thickness of the attachment portion. The first and second overlapping regions each include a thin portion having a thickness smaller than the thickness of the thick portion.

5 Claims, 11 Drawing Sheets

(51) Int. Cl.
    *B21D 53/86*     (2006.01)
    *B21D 7/02*     (2006.01)

(56) References Cited

U.S. PATENT DOCUMENTS

| | | | |
|---|---|---|---|
| 5,832,785 A * | 11/1998 | Costahaude | B62K 21/12 |
| | | | 74/551.1 |
| 5,950,497 A * | 9/1999 | Weiher | B62K 21/12 |
| | | | 74/551.1 |
| 6,182,528 B1 * | 2/2001 | Renshaw | B62K 21/12 |
| | | | 74/551.4 |
| 10,328,884 B2 * | 6/2019 | Kobayashi | B60R 21/231 |
| 2005/0199089 A1 | 9/2005 | Mangano et al. | |
| 2005/0268742 A1 | 12/2005 | Koike | |
| 2008/0149231 A1 * | 6/2008 | Kitsunai | C22C 23/02 |
| | | | 148/666 |
| 2010/0186542 A1 | 7/2010 | Hashimoto | |
| 2017/0106933 A1 * | 4/2017 | Marui | B62K 21/18 |
| 2017/0267309 A1 | 9/2017 | Monna et al. | |

FOREIGN PATENT DOCUMENTS

| | | | |
|---|---|---|---|
| JP | H0318505 U | | 2/1991 |
| JP | H03-57790 A | | 3/1991 |
| JP | 2596851 B2 | | 4/1997 |
| JP | 2002-254132 | * | 9/2002 |
| JP | 2010-167924 A | | 8/2010 |
| JP | 2012-250589 A | | 12/2012 |
| JP | 2014-032032 A | | 2/2014 |
| JP | 2017-039390 A | | 2/2017 |
| WO | WO 0021824 | * | 4/2000 |

* cited by examiner

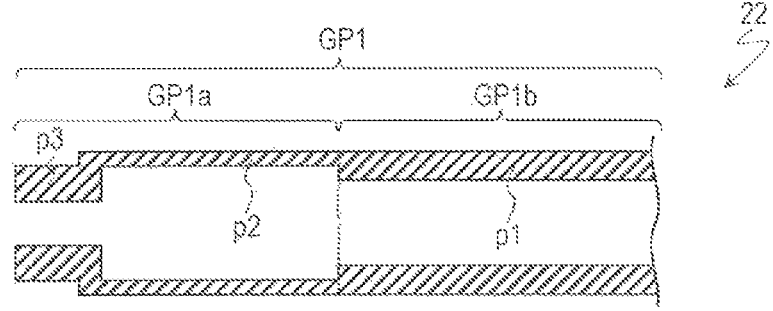
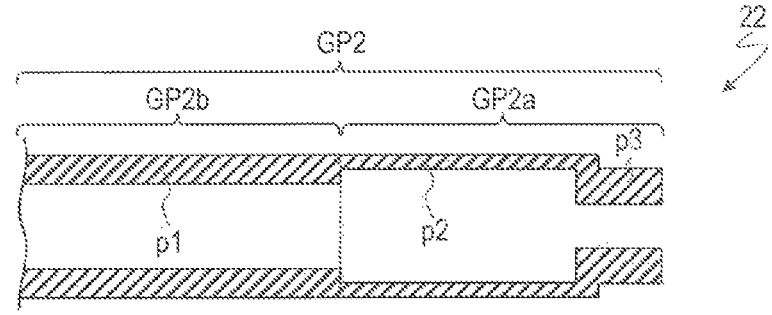

METHOD FOR PRODUCING HANDLE PIPE FOR STRADDLED VEHICLE

CROSS-REFERENCE TO RELATED APPLICATION

This application is a divisional of U.S. application Ser. No. 16/001,303, filed on Jun. 6, 2018, and claims the benefit of priority of the Japanese Application No. 2017-114742, filed on Jun. 9, 2017, the content of which is incorporated herein by reference in its entirety.

BACKGROUND OF THE INVENTION

1. Field of the Invention

The present invention relates to a handle for a straddled vehicle, and also to a straddled vehicle, and a method for producing a handle pipe for a straddled vehicle.

2. Description of the Related Art

A handle for a straddled vehicle includes a handle pipe and a handle grip. The handle pipe (also referred to as a "handle bar") is a tube-type member mainly formed of a metal material. The handle grip is to be gripped by a rider, and is attached to each of two ends of the handle pipe.

The handle for a straddled vehicle is available in a type in which the handle pipe has the same outer diameter entirely and a type in which a central portion of the handle pipe has an outer diameter larger than that of each of the two ends thereof. The latter type is referred to as a "tapered handle", and is used for, for example, an off-road motorcycle. U.S. Pat. No. 5,117,708 discloses a handle pipe for a tapered handle.

In the handle pipe disclosed in U.S. Pat. No. 5,117,708, both of two ends thereof are each thicker than a central portion thereof. A handle pipe having such a thickness distribution is produced by, for example, swaging (diameter contraction of the two ends thereof).

Recently, a straddled vehicle such as a motorcycle or the like is desired to be further reduced in weight. The present inventors made studies from various points of view for reducing the weight of the handle. Since there are restrictions imposed by standards or the like on the outer diameter of the handle pipe, the present inventors attempted to reduce the weight of the handle by thinning the handle pipe.

However, it has been found by the studies made by the present inventors that reduction in the weight of the handle by thinning the handle pipe results in a change in the level of comfort of riding, which may fatigue the rider.

The present invention made in light of the above-described problem has an object of reducing the weight of a handle of a straddled vehicle while alleviating the fatigue of the rider.

SUMMARY OF THE INVENTION

A handle for a straddled vehicle in an embodiment according to the present invention includes a first handle grip and a second handle grip graspable by a rider; and a tube-like handle pipe supporting the first handle grip and the second handle grip. The handle pipe includes an attachment portion located in a central portion in a longitudinal direction, the attachment portion being attachable to a steering rotation device; a first grip portion located at one of two ends in the longitudinal direction, the first grip portion having the first handle grip attached thereto; a second grip portion located at the other of the two ends in the longitudinal direction, the second grip portion having the second handle grip attached thereto; a first bent portion located between the attachment portion and the first grip portion, the first bent portion extending from one of two ends of the attachment portion to one of two ends of the first grip portion, the first bent portion extending in a direction different from a direction in which the attachment portion extends; and a second bent portion located between the attachment portion and the second grip portion, the second bent portion extending from the other end of the two ends of the attachment portion to one of two ends of the second grip portion, the second bent portion extending in a direction different from the direction in which the attachment portion extends. The first grip portion includes a first overlapping region overlapping the first handle grip and a first non-overlapping region located between the first overlapping region and the first bent portion, the first non-overlapping region not overlapping the first handle grip; the second grip portion includes a second overlapping region overlapping the second handle grip and a second non-overlapping region located between the second overlapping region and the second bent portion, the second non-overlapping region not overlapping the second handle grip; the first non-overlapping region of the first grip portion and the second non-overlapping region of the second grip portion each include a thick portion having a thickness larger than, or equal to, a thickness of the attachment portion; and the first overlapping region of the first grip portion and the second overlapping region of the second grip portion each include a thin portion having a thickness smaller than the thickness of the thick portion.

In an embodiment, the thickness of the thin portion is smaller than the thickness of the attachment portion.

In an embodiment, the thin portion is provided such that the first overlapping region of the first grip portion and the second overlapping region of the second grip portion each have a mass that is 12% or less of a mass of the entirety of the handle pipe.

In an embodiment, where a border between the first overlapping region and the first non-overlapping region of the first grip portion is a first border, and a border between the second overlapping region and the second non-overlapping region of the second grip portion is a second border, the thin portion in the first overlapping region is provided from the other of the two ends of the first grip portion to a predetermined first position; the thin portion in the second overlapping region is provided from the other of the two ends of the second grip portion to a predetermined second position; and a distance between the first position and the first border and a distance between the second position and the second border are each 30 mm or less.

In an embodiment, the thin portion is provided in substantially the entirety of each of the first overlapping region and the second overlapping region.

In an embodiment, the thickness of the thin portion is smaller than the thickness of the thick portion in the entirety of a circumferential direction of the handle pipe.

In an embodiment, the thickness of the thin portion is smaller than the thickness of the thick portion partially in a circumferential direction of the handle pipe.

In an embodiment, the thickness of the thin portion is substantially the same in the longitudinal direction of the handle pipe, and is symmetrical.

In an embodiment, the thickness of the thin portion is changed in the longitudinal direction of the handle pipe.

In an embodiment, there is no weight member located in the first grip portion or the second grip portion.

In an embodiment, the handle pipe is formed of a non-iron metal material.

In an embodiment, the attachment portion of the handle pipe has an outer diameter larger than an outer diameter of each of the first grip portion and the second grip portion.

In an embodiment, the first bent portion and the second bent portion each have a flattening of 5% or less in a central portion thereof.

A straddled vehicle in an embodiment according to the present invention includes the handle for a straddled vehicle having any of the above-described structures.

A method for producing a handle pipe for a straddled vehicle in an embodiment according to the present invention is a method for producing the handle pipe including an attachment portion located in a central portion in a longitudinal direction, the attachment portion being attachable to a steering rotation device; a first grip portion located at one of two ends in the longitudinal direction; a second grip portion located at the other of the two ends in the longitudinal direction; a first bent portion located between the attachment portion and the first grip portion, the first bent portion extending from one of two ends of the attachment portion to one of two ends of the first grip portion, the first bent portion extending in a direction different from a direction in which the attachment portion extends; and a second bent portion located between the attachment portion and the second grip portion, the second bent portion extending from the other end of the two ends of the attachment portion to one of two ends of the second grip portion, the second bent portion extending in a direction different from the direction in which the attachment portion extends. The method includes step (A) of preparing a tube-like workpiece formed of a metal material; step (B) of processing the workpiece such that an outer diameter of each of regions of the workpiece to be the first grip portion and the second grip portion is smaller than an outer diameter of a region of the workpiece to be the attachment portion; step (C) of processing the workpiece with solution heat treatment after the step (B); and step (D) of bending the workpiece after the step (C).

In an embodiment the workpiece prepared in the step (A) is a workpiece produced by extrusion.

In an embodiment, the method further includes step (E) of partially thinning each of the regions of the workpiece to be the first grip portion and the second grip portion. The first grip portion and the second grip portion each include a thick portion having a thickness larger than, or equal to, a thickness of the attachment portion and a thin portion having a thickness smaller than the thickness of the thick portion.

In an embodiment, the step (E) is performed by machining after the step (B).

In an embodiment, the step (B) is performed by swaging; and the step (E) is performed in the step (B).

In the handle for a straddled vehicle in an embodiment according to the present invention, the first grip portion and the second grip portion of the handle pipe each include the thick portion having a thickness larger than, or equal to, a thickness of the attachment portion, and the thin portion having a thickness smaller than the thickness of the thick portion. Specifically, the thick portion is provided in the first non-overlapping region (region not overlapping the first handle grip) of the first grip portion and the second non-overlapping region (region not overlapping the second handle grip) of the second grip portion. Specifically, the thin portion is formed in the first overlapping region (region overlapping the first handle grip) of the first grip portion and the second overlapping region (region overlapping the second handle grip) of the second grip portion. Since the first grip portion and the second grip portion each include the thick portion, the handle certainly provides a sense of sufficient rigidity. Since the first grip portion and the second grip portion each include the thin portion, the handle is made more lightweight than in a case where, for example, the first grip portion and the second grip portion are entirely the thick portion. In the case where the thick portion is located in each of relatively inner regions of the first grip portion and the second grip portion (the first non-overlapping region and the second non-overlapping region) and the thin portion is located in each of relatively outer regions of the first grip portion and the second grip portion (the first overlapping region and the second overlapping region), the sense of being pushed up is decreased. Therefore, fatigue of the rider is reduced. As described above, an embodiment according to the present invention reduces the weight of the handle for a straddled vehicle while alleviating the fatigue of the rider.

In the case where the thickness of the thin portion is smaller than the thickness of the attachment portion, the handle is more lightweight.

From the point of view of providing a sufficient effect of reducing the weight of the handle and the point of view of decreasing the sense of being pushed up with more certainty, it is preferred that the thin portions are provided such that the mass of each of the first overlapping region of the first grip portion and the second overlapping region of the second grip portion is 12% or less of the entire mass of the handle pipe.

From the point of view of reducing the weight of the handle, it is preferred that the thin portion is as large as possible in each of the first overlapping region and the second overlapping region. For example, the thin portion in the first overlapping region may be provided from an end of the first grip portion (end opposite to the first bent portion) to a predetermined position (first position). The thin portion in the second overlapping region may be provided from an end of the second grip portion (end opposite to the second first bent portion) to a predetermined position (second position). Where the border between the first overlapping region and the first non-overlapping region in the first grip portion is referred to as a "first border", and a border between the second overlapping region and the second non-overlapping region in the second grip portion is referred to as a "second border", it is preferred that the distance between the first position and the first border, and the distance between the second position and the second border, are each 30 mm or less.

In the case where the thin portion is provided in substantially the entirety of each of the first overlapping region and the second overlapping region, the sufficient effect of reducing the weight is more easily provided.

In the case where the thickness of the thin portion is smaller than the thickness of the thick portion in the entirety of a circumferential direction of the handle pipe (namely, the handle pipe is thinned in the entirety of the circumferential direction thereof), the effect of reducing the weight is higher than in the case where the handle pipe is thinned partially in the circumferential direction.

In the case where the thickness of the thin portion is smaller than the thickness of the thick portion partially in the circumferential direction, the flexural rigidity of the first grip portion and the second grip portion is easily adjusted.

The thickness of each thin portion may be substantially the same in the longitudinal direction of the handle pipe and may be symmetrical, or may change in the longitudinal direction of the handle pipe.

The handle for a straddled vehicle in an embodiment according to the present invention does not need to include a weight member in the first grip portion or the second grip portion.

An embodiment according to the present invention has significance in the case where the handle pipe is formed of a non-iron metal material. The reason is as follows. In the case where the handle pipe is formed of an iron-based material such as steel or the like, it is difficult to reduce the weight of the handle pipe by decreasing the thickness because the handle pipe formed of an iron-based material is already thin. By contrast, in the case where the handle pipe is formed of a non-iron metal material, the handle pipe may need to be entirely thick in order to have a requisite level of rigidity under the restrictions on the shape required by the posture of the rider riding the motorcycle. In an embodiment according to the present invention, the relatively large thickness is well utilized (more specifically, the thin portion is selectively formed as described above), so that the requisite level of rigidity is satisfied while the fatigue of the rider is alleviated.

An embodiment according to the present invention is preferably applicable to a handle in which the outer diameter of the attachment portion of the handle pipe is larger than the outer diameter of each of the first grip portion and the second grip portion (so-called tapered handle). In the case where a handle pipe for such a tapered handle is produced by, for example, swaging, the thickness of the handle pipe becomes larger from the central portion (attachment portion) toward the ends. This easily increases the weight of the handle pipe. In an embodiment according to the present invention, the first grip portion and the second grip portion of the handle pipe each include the thin portion. This preferably realizes a lightweight tapered handle.

From the point of view of uniformizing the rigidity, it is preferred that the flattening of each of the first bent portion and the second bent portion is low. Specifically, it is preferred that the first bent portion and the second bent portion each have a flattening of 5% or less in the central portion thereof.

According to the method in an embodiment of the present invention, the solution heat treatment is performed before the bending. In the case where the solution heat treatment is performed after the bending, the workpiece is kept at a high temperature and then is rapidly cooled after being molded into a product shape. Thus, the workpiece is significantly deformed by the heat treatment. This requires the workpiece to be corrected after being processed with the solution heat treatment. By contrast, in an embodiment according to the present invention, the solution heat treatment is performed before the bending. Therefore, the workpiece does not need to be corrected. In addition, the workpiece is bent after becoming hard to a certain degree by the solution heat treatment. Therefore, the cross-sectional shape of the first bent portion and the second bent portion is not easily changed. This allows the flattening of the first bent portion and the second bent portion to be low.

The prepared workpiece is preferably a workpiece produced by extrusion (extruded member), and is more preferably a workpiece produced by hydrostatic pressure extrusion (hydrostatic pressure-extruded member). The extruded member has a highly uniform thickness. The hydrostatic pressure-extruded member has a higher strength than that of a general extruded member.

The regions of the workpiece to be the first grip portion and the second grip portion may partially be thinned. In the case where the first grip portion and the second grip portion each include the thick portion having the thickness larger than, or equal to, the thickness of the attachment portion and the thin portion having the thickness smaller than the thickness of the thick portion, the handle is reduced in weight and the fatigue of the rider is suppressed.

The step of partially thinning the regions to be the first grip portion and the second grip portion may be preferably performed by, for example, machining.

The method for producing the handle in an embodiment according to the present invention includes a step of processing the workpiece such that the outer diameter of the regions of the workpiece to be the first grip portion and the second grip portion is smaller than the outer diameter of the region of the workpiece to be the attachment portion (diameter contraction step). The diameter contraction step may be preferably performed by, for example, swaging. In such a case, the regions to be the first grip portion and the second grip portion may partially be thinned in the diameter contraction step.

An embodiment according to the present invention reduces the weight of the handle for a straddled vehicle and also alleviates the fatigue of the rider.

BRIEF DESCRIPTION OF THE DRAWINGS

FIG. 9A and FIG. 9B are cross-sectional views showing an example of structure of the first grip portion GP1 and the second grip portion GP2 (cross sections taken along lines IXA and IXB in FIG. 3A).

DETAILED DESCRIPTION

Hereinafter, embodiments of the present disclosure will be described with reference to the drawings. The present invention is not limited to any of the following embodiments.

(Overall Structure of the Motorcycle)

Figure 1:
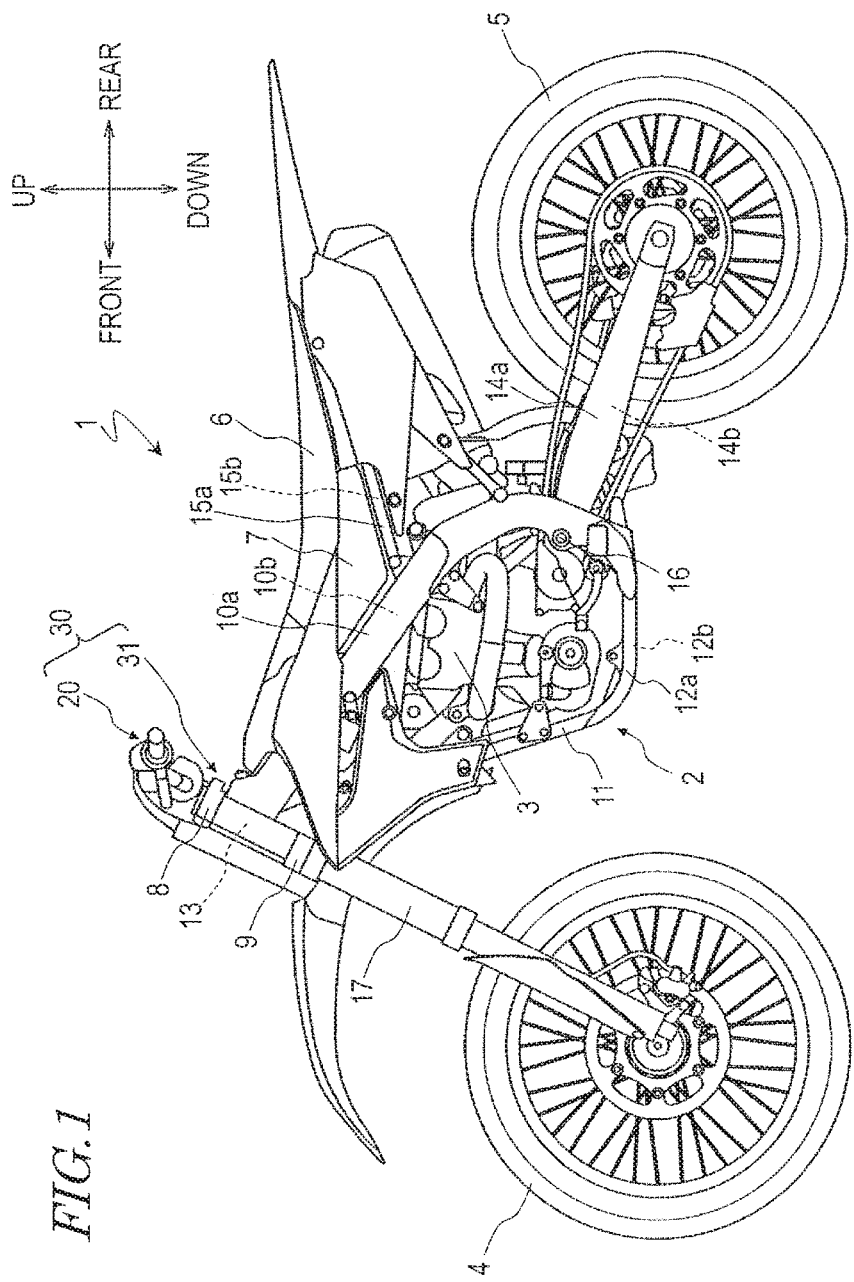
FIG. 1 is a left side view showing a schematic structure of a motorcycle (straddled vehicle) 1 in an embodiment according to the present invention.

FIG. 1 is a left side view showing a schematic structure of a motorcycle (straddled vehicle) 1. The motorcycle 1 is a vehicle for motocross, which is assumed to run on a rough terrain. As shown in FIG. 1, the motorcycle 1 includes a vehicle frame 2, an engine 3, a front wheel 4, a rear wheel 5, a seat 6, a fuel tank 7, and a handle 20. In the following description, the terms "front", "rear", "left" and "right" respectively refer to front, rear, left and right as seen from a rider (driver) sitting on the seat 6 while gripping the handle 20.

The vehicle frame 2 is a cradle-type frame, and supports the engine 3. The vehicle frame 2 includes a first main frame 10a, a second main frame 10b, a down frame 11, a first bottom frame 12a, a second bottom frame 12b, a head pipe 13, a pair of rear arms 14a and 14b, a first rear arm 15a, and a second rear arm 15b.

The head pipe 13 is located in a front part of the motorcycle 1. The first main frame 10a and the second main frame 10b are located side by side in a vehicle width direction (left-right direction). The first main frame 10a and the second main frame 10b extend obliquely rearward and downward from the head pipe 13.

The first main frame 10a is located in a left part of the motorcycle 1, and the second main frame 10b is located in a right part of the motorcycle 1. A pivot shaft 16 is provided at bottom ends of the first main frame 10a and the second main frame 10b.

The down frame 11 is connected with the head pipe 13 at a position lower than a position at which the first main frame 10a and the second main frame 10b is connected with the head pipe 13. The down frame 11 extends rearward and downward from the head pipe 13.

The first bottom frame 12a connects a bottom end of the down frame 11 and a bottom end of the first main frame 10a to each other. The second bottom frame 12b connects the bottom end of the down frame 11 and a bottom end of the second main frame 10b to each other.

With the above-described structure, as seen from the left side of the motorcycle 1, the head pipe 13, the first main frame 10a, the down frame 11 and the first bottom frame 12a are connected in a loop. As seen from the right side of the motorcycle 1, the head pipe 13, the second main frame 10b, the down frame 11 and the second bottom frame 12b are also connected in a loop.

The pair of rear arms 14a and 14b are respectively located in the left part and the right part of the motorcycle 1. The pair of rear arms 14a and 14b have front ends each attached to the pivot shaft 16, and are supported by the pivot shaft 16 so as to be swingable upward and downward. The rear wheel 5 is held in the vehicle width direction between, and rotatably attached to, rear ends of the pair of rear arms 14a and 14b.

The first rear frame 15a is located in the left part of the motorcycle 1, whereas the second rear frame 15b is located in the right part of the motorcycle 1. The first rear frame 15a has a front end connected with the first main frame 10a, and extends rearward from the first main frame 10a. The second rear frame 15b has a front end connected with the second main frame 10b, and extends rearward from the second main frame 10b.

The head pipe 13 supports a steering device 30 such that the steering device 30 is rotatable. The steering device 30 is capable of changing the advancing direction of the motorcycle 1. The steering device 30 includes a steering rotation device 31 and the handle 20. The steering rotation device 31 includes a steering shaft (not shown), an upper bracket 8, an under bracket 9, a front suspension 17, and the front wheel 4. A top end, of the steering shaft (not shown), located in the head pipe 13 is attached to the upper bracket 8, and a bottom end of the steering shaft is attached to the under bracket 9. The upper bracket 8 and the under bracket 9 each have left and right ends that retain a top portion of the front suspension 17. The front wheel 4 is rotatably attached to a bottom end of the front suspension 17. The handle 20 is attached to the upper bracket 8. The steering device 30 is structured such that an operation, performed by the rider gripping the handle 20, of rotating the handle 20 around the steering shaft results in a rotation of the steering rotation device 31 around the steering shaft, which changes an orientation of the front wheel 4.

The seat 6 is located above the first main frame 10a and the second main frame 10b and to the rear of the head pipe 13. The fuel tank 7 is located below the seat 6. The engine 3 is located below the first main frame 10a and the second main frame 10b and to the rear of the down frame 11.

(Structure of the Handle)

Figure 2A:
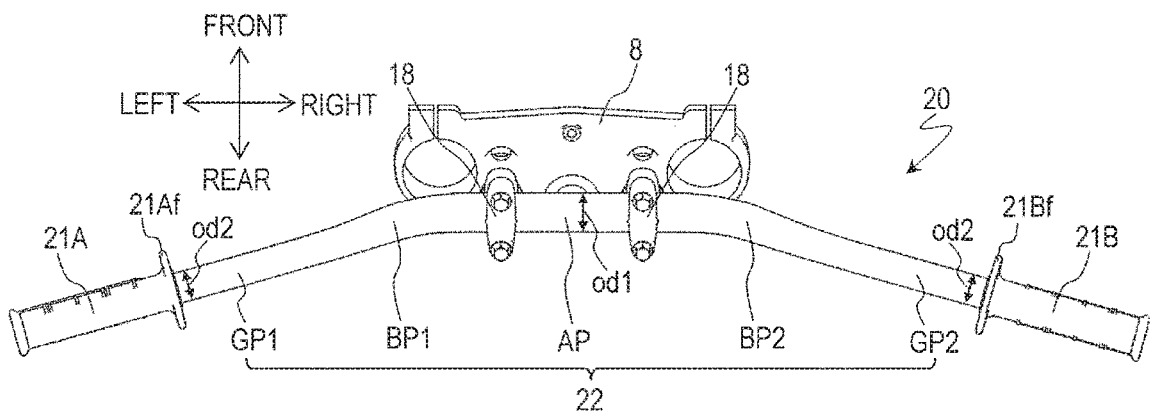
FIG. 2A, FIG. 2B and FIG. 2C are respectively a plan view, a left side view and a rear view as seen obliquely from above, of a handle 20 of the motorcycle 1.
Figure 2B:
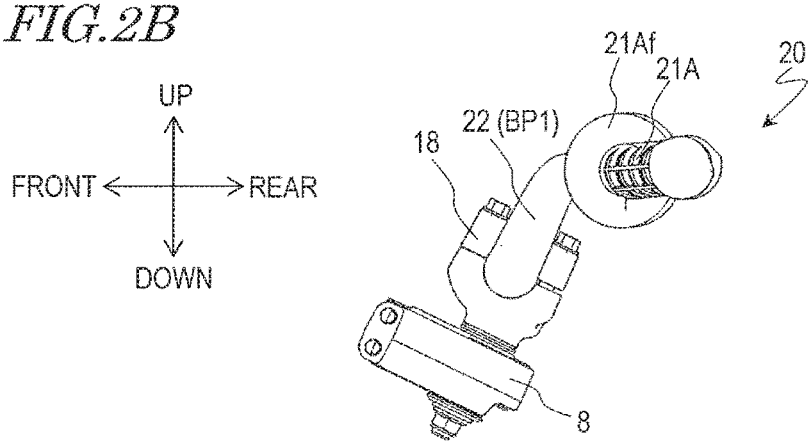
Figure 2C:
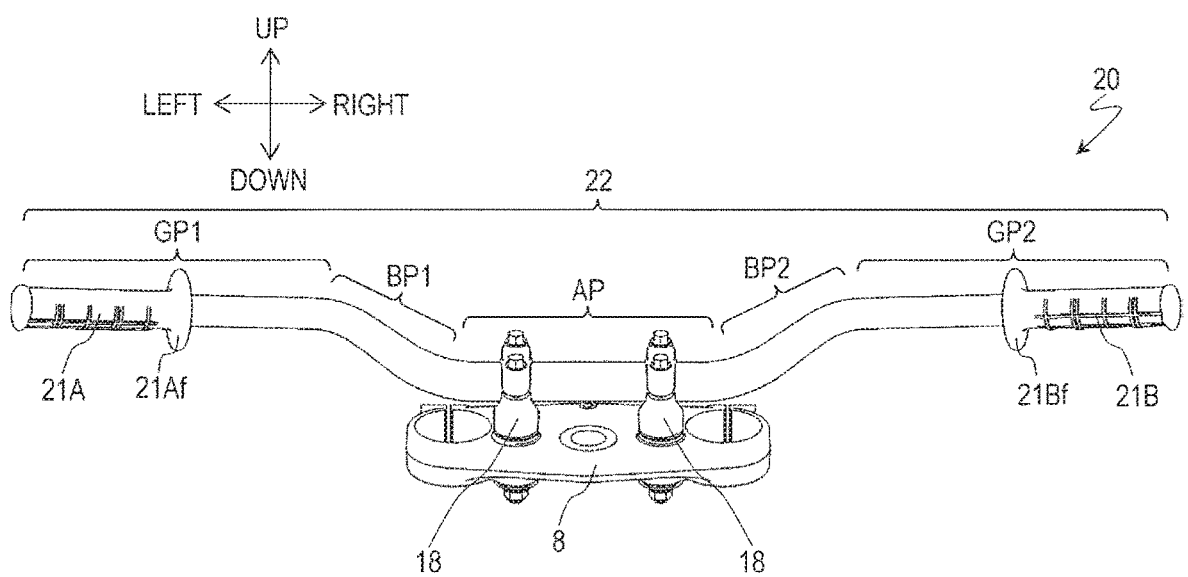

With reference to FIG. 2A, FIG. 2B and FIG. 2C, a structure of the handle 20 will be described. FIG. 2A, FIG. 2B and FIG. 2C are respectively a plan view, a left wide view, and a rear view as seen obliquely from above, of the handle 20. FIG. 2A, FIG. 2B and FIG. 2C also show the upper bracket 8.

As shown in FIG. 2A, FIG. 2B and FIG. 2C, the handle 20 includes a pair of handle grips (first handle grip and second handle grip) 21A and 21B, and a handle pipe (also referred to as a "handle bar") 22. The handle 20 may further include a lever (clutch lever or brake lever), a switch unit and the like, which are omitted in these figures.

The first handle grip 21A and the second handle grip 21B are graspable by the rider. The first handle grip 21A and the second handle grip 21B are each cylindrical and are formed of, for example, rubber. Brims 21Af and 21Bf are respectively provided at ends (inner ends) of the first handle grip 21A and the second handle grip 21B.

The handle pipe 22 is tube-like (namely, is hollow), and is typically formed of a metal material. The handle pipe 22 supports the first handle grip 21A and the second handle grip 21B.

The handle pipe 22 includes an attachment portion AP, a pair of grip portions (first grip portion and second grip portion) GP1 and GP2, and a pair of bent portions (first bent portion and second bent portion) BP1 and BP2.

The attachment portion AP is at a central portion of the handle pipe 22 in a longitudinal direction. The attachment portion AP extends generally straight. The attachment portion AP is to be attached to the steering rotation device 31. In the example shown in the figures, the attachment portion AP is attached to the upper bracket 8 via a pair or clamp members 18. The structure usable to attach the attachment portion AP to the steering rotation device 31 is not limited to that described above. For example, the attachment portion AP may be attached to the steering rotation device 31 via one clamp member.

The first grip portion GP1 is located at one of two ends of the handle pipe 22 in the longitudinal direction (in this example, at the left end). The first grip portion GP1 extends generally straight. The first grip portion GP1 extends in the vehicle width direction in the state where the steering device 30 is oriented in the front-rear direction (hereinafter, referred to as a "vehicle straight advancing state") of the motorcycle 1. In the vehicle straight advancing state, a left end of the first grip portion GP1 is located to the rear of, and above, the attachment portion AP. At the left end of the first grip portion GP1, the first handle grip 21A is attached.

The second grip portion GP2 is located at the other of the two ends of the handle pipe 22 in the longitudinal direction (in this example, at the right end). The second grip portion GP2 extends generally straight. The second grip portion GP2 extends in the vehicle width direction in the vehicle straight advancing state. In the vehicle straight advancing state, a right end of the second grip portion GP2 is located to the rear of, and above, the attachment portion AP. At the right end of the second grip portion GP2, the second handle grip 21B is attached.

The first bent portion BP1 is located between the attachment portion AP and the first grip portion GP1. The first bent portion BP1 extends from one of two ends of the attachment portion AP to a right end of the first grip portion GP1, and in a direction different from the direction in which the attachment portion AP extends. More specifically, the first bent portion BP1 extends upward and rearward. The first bent portion BP1 connects the attachment portion AP and the first grip portion GP1 to each other.

The second bent portion BP2 is located between the attachment portion AP and the second grip portion GP2. The second bent portion BP2 extends from the other of the two ends of the attachment portion AP to a left end of the second grip portion GP2, and in a direction different from the direction in which the attachment portion AP extends. More specifically, the second bent portion BP2 extends upward and rearward. The second bent portion BP2 connects the attachment portion AP and the second grip portion GP2 to each other.

In this example, outer diameter od1 (see FIG. 2A) of the attachment portion AP is larger than outer diameter od2 of each of the first grip portion GP1 and the second grip portion GP2. Namely, the handle 20 is a so-called tapered handle.

Figure 3A:
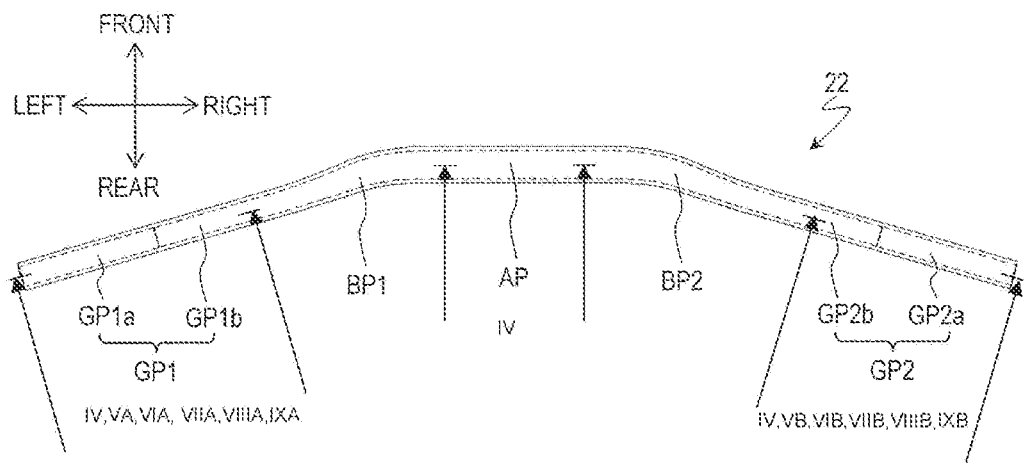
FIG. 3A, FIG. 3B and FIG. 3C are respectively a plan view, a left side view and a rear view as seen obliquely from above, of a handle pipe 22 of the handle 20.
Figure 3B:
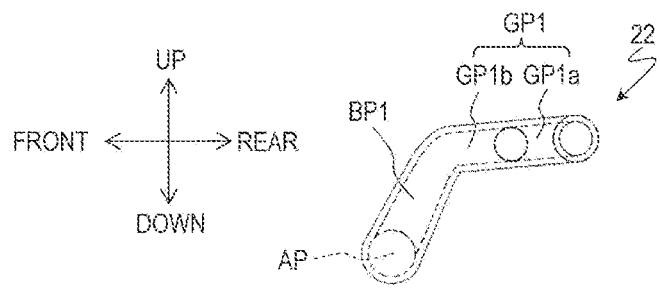
Figure 3C:
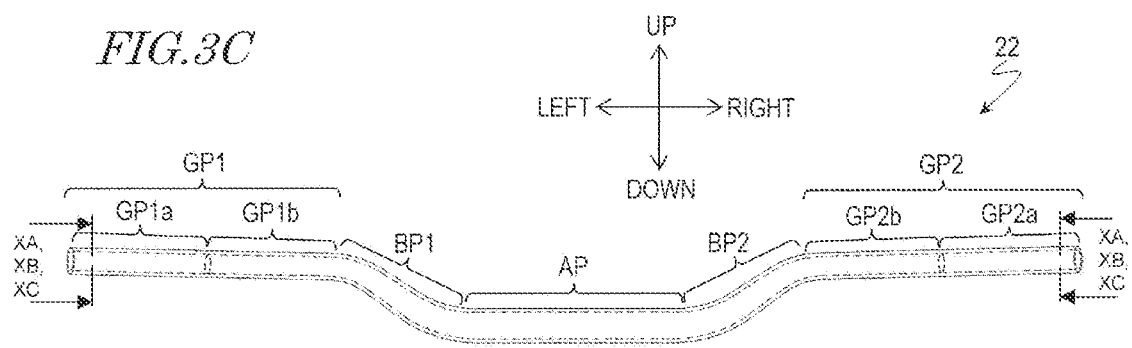

Now, with reference also to FIG. 3A, FIG. 3B and FIG. 3C, the structure of the handle pipe 22 included in the handle 20 will be described in more detail. FIG. 3A, FIG. 3B and FIG. 3C respectively correspond to FIG. 2A, FIG. 2B and FIG. 2C, but show only the handle pipe 22.

As shown in FIG. 3A, FIG. 3B and FIG. 3C, the first grip portion GP1 includes a first overlapping region GP1a and a first non-overlapping region GP1b. The first overlapping region GP1a is a region overlapping the first handle grip 21A. The first non-overlapping region GP1b is located between the first overlapping region GP1a and the first bent portion BP1 and does not overlap the first handle grip 21A.

Similarly, the second grip portion GP2 includes a second overlapping region GP2a and a second non-overlapping region GP2b. The second overlapping region GP2a is a region overlapping the second handle grip 21B. The second non-overlapping region GP2b is located between the second overlapping region GP2a and the second bent portion BP2 and does not overlap the second handle grip 21B.

Hereinafter, the first overlapping region GP1a and the second overlapping region GP2a may be collectively referred to as "overlapping regions". The first non-overlapping region GP1b and the second non-overlapping region GP2b may be collectively referred to as "non-overlapping regions".

Figure 4:
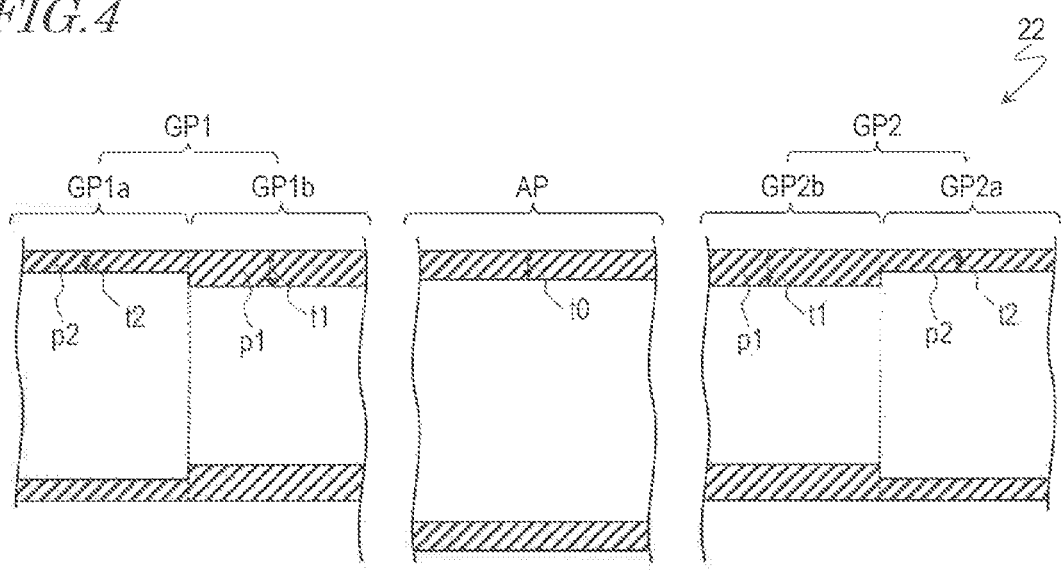
FIG. 4 shows cross-sections of an attachment portion AP, a first grip portion GP1 and a second grip portion GP2 of the handle pipe 22 (cross-section taken along line IV in FIG. 3A).

Now, with reference to FIG. 4, the thickness relationship among the components of the handle pipe 22 will be described. FIG. 4 shows cross-sections of the attachment portion AP, the first grip portion GP1 and the second grip portion GP2, taken along the longitudinal direction of the handle pipe 22.

The first non-overlapping region GP1b of the first grip portion GP1 and the second non-overlapping region GP2b of the second grip portion GP2 each include a thick portion p1 having thickness t1, which is larger than, or equal to, thickness t0 of the attachment portion AP.

The first overlapping region GP1a of the first grip portion GP1 and the second overlapping region GP2a of the second grip portion GP2 each include a thin portion p2 having thickness t2, which is smaller than thickness t1 of the thick portion p1. In this example, thickness t2 of the thin portion p2 is smaller than thickness t0 of the attachment portion AP.

The first bent portion BP1 and the second bent portion BP2 typically have a thickness larger than, or equal to, thickness t0 of the attachment portion AP. In the case where swaging described below is used to produce the handle pipe 22, the thickness of the first bent portion BP1 gradually increases from an end thereof close toward the attachment portion AP toward an end thereof close to the first grip portion GP1. Similarly, the thickness of the second bent portion BP2 gradually increases from an end thereof close to the attachment portion AP toward an end thereof close to the second grip portion GP2.

As described above, in the handle 20 in this embodiment, the first grip portion GP1 and the second grip portion GP2 of the handle pipe 22 each include the thick portion p1 having thickness t1 larger than, or equal to, thickness t0 of the attachment portion AP, and the thin portion p2 having thickness t2 smaller than thickness t1 of the thick portion p1. Specifically, the thick portion p1 is provided in the non-overlapping region GP1b of the first grip portion GP1 and the non-overlapping region GP2b of the second grip portion GP2. Specifically, the thin portion p2 is formed in the overlapping region GP1a of the first grip portion GP1 and the overlapping region GP2a of the second grip portion GP2. Since the first grip portion GP1 and the second grip portion GP2 each include the thick portion p1, the handle pipe 22 certainly provides a sense of sufficient rigidity. Since the first grip portion GP1 and the second grip portion GP2 each include the thin portion p2, the handle pipe 22 is made more lightweight than in a case where, for example, the first grip portion GP1 and the second grip portion GP2 are entirely the thick portion p1. It has been found by the studies made by the present inventors that in the case where the thick portion p1 is located in each of relatively inner regions of the grip portions GP1 and GP2 (first non-overlapping region GP1b and second non-overlapping region GP2b) and the thin portion p2 is located in each of relatively outer regions of the grip portions GP1 and GP2 (first overlapping region GP1a and second overlapping region GP2a), fatigue of the rider is reduced. A conceivable reason for this is that the above-described thickness distribution decreases the sense of being pushed up and provides a preferable sense of operation.

It was investigated in which case such a preferable sense of operation would be provided, and a reason for this was estimated. Results thereof will be described.

Handles in an example and comparative examples 1 through 3 were produced by use of an aluminum alloy as a metal material. An investigation was performed on the sense of operation. Table 1 shows the results. The investigation was performed on three items: the sense of being pushed up, the sense of steerability, and the sense of rigidity. The investigation was performed as follows. A motorcycle including the handle in the example and comparative examples 1 through 3 was caused by a rider to run on a rugged surface, and the rider made evaluations. In the example and comparative examples 1 through 3, the thickness of the attachment portion and the thickness of the grip portions are as shown in Table 2. As shown in Table 2, in comparative examples 1 through 3, the entirety of the grip portions (i.e., the overlapping regions and the non-overlapping regions) has the same thickness. By contrast, in the example, the thickness of the overlapping regions (length of each overlapping region in the longitudinal direction is 113 mm) is smaller than the thickness of the non-overlapping regions. Table 2 also shows the weight of the entirety of the handle pipe and the weight of the overlapping region of each grip portion in the example and comparative examples 1 through 3.

TABLE 1

|  | SENSE OF RIGIDITY | SENSE OF STEERABILITY | SENSE OF BEING PUSHED UP |
|---|---|---|---|
| EXAMPLE | 2.9 | 3.2 | 3 |
| COMPARATIVE EXAMPLE 1 | 3 | 3 | 3 |
| COMPARATIVE EXAMPLE 2 | 2.7 | 3.1 | 2.8 |
| COMPARATIVE EXAMPLE 3 | 2.5 | 3 | 2.8 |

TABLE 2

|  | THICKNESS OF ATTACHMENT PORTION | THICKNESS OF GRIP PORTION | | WEIGHT OF HANDLE PIPE | WEIGHT OF OVERLAPPING REGION |
|---|---|---|---|---|---|
|  |  | NON-OVERLAPPING REGION | OVERLAPPING REGION |  |  |
| EXAMPLE | 3.2 mm | 4.3 mm | 3.0 mm | 536 g | 58 g |
| COMPARATIVE EXAMPLE 1 | 4.0 mm | 4.0 mm |  | 644 g | 72 g |
| COMPARATIVE EXAMPLE 2 | 3.2 mm | 4.0 mm |  | 564 g | 72 g |
| COMPARATIVE EXAMPLE 3 | 3.2 mm | 4.3 mm |  | 577 g | 76 g |

The sense of operation was evaluated based on comparative example 1. In comparative example 1, the handle pipe is heaviest, but the handle provides no problem in the sense of operation. In comparative example 2, the handle pipe is more lightweight than in comparative example 1, but the handle is inferior to that in comparative example 1 on the sense of being pushed up and the sense of rigidity. In comparative example 3, the handle pipe is more lightweight than in comparative example 1, but the handle is inferior to that in comparative example 1 on the sense of being pushed up and the sense of rigidity.

By contrast, in the example, the handle pipe is significantly more lightweight than in comparative example 1, and the handle is substantially equal to that in comparative example 1 on the sense of being pushed up and the sense of rigidity and is superior to that in comparative example 1 on the sense of steerability.

As seen from above, it has been confirmed that since the overlapping regions GP1$a$ and GP2$a$ of the grip portions GP1 and GP2 each include the thin portion p2, the handle is more lightweight and provides a preferable sense of operation. It is presumed that the sense of rigidity, the sense of being pushed up and the sense of steerability are improved by thinning the overlapping regions GP1$a$ and GP2$a$ for the following reasons.

[Sense of Rigidity]

When applying a load to the grip portions via the handle grip, the rider senses a displacement behavior of the grip portions. A displacement behavior of the grip portions in response to the load that is too small or too large is not felt to be preferable by the rider. A displacement of the grip portions that is appropriate is felt to be preferable by the rider. In the case where the thin portions are located in the overlapping regions of the grip portions and the thick portions are located in the non-overlapping regions of the grip portions, an appropriate displacement is realized and a preferable sense of rigidity is provided.

[Sense of being Pushed Up]

While a motorcycle is running on a rugged surface, the handle vibrates. The rider senses the vibration behavior of the grip portions as a sense of being pushed up. In the case where the vibration is large or the attenuation of the vibration is slow, the rider feels that the sense of being pushed up is large. As a parameter showing the attenuation of the vibration, logarithmic decrement $\delta$ is known. The logarithmic decrement $\delta$ is represented by the following expression by use of damping ratio $\zeta$.

$$\delta = 2\pi\zeta$$

As represented by the following expression, the damping ratio $\zeta$ is the ratio of damping coefficient C and the critical damping coefficient Cc.

$$\zeta = C/Cc$$

The critical damping coefficient Cc is represented by the following expression by use of the mass m of the mass point and the spring constant k.

$$Cc = 2(mk)^{1/2}$$

Therefore, as the mass m is smaller, or as the spring constant k is smaller, the logarithmic decrement $\delta$ is larger and the attenuation is quicker.

Applying the above to the vibration of the handle, it is considered that as the ends of the grip portions (i.e., overlapping regions) have a smaller mass and have a lower rigidity, the attenuation of the vibration is quicker. Therefore, in the case where the overlapping region of each grip portion includes the thin portion, the attenuation is quicker and thus the rider feels that the sense of being pushed up is alleviated.

[Sense of Steerability]

In the case where a portion far from the gravitational center of a vehicle is more lightweight, the moment of inertia is smaller, and thus the rider feels the weight less easily when inclining the vehicle or keeping the posture of the vehicle. Therefore, in the case where the overlapping region of the grip portions located at each of the two ends of the handle is thinned, the sense of steerability is improved.

As described above, in an embodiment according to the present invention, the weight is reduced without sacrificing the sense of operation. Therefore, the weight of the handle is reduced while the fatigue of the rider is alleviated.

Hereinafter, preferred structures of the handle 20 in this embodiment and modifications thereof will be described.

Thickness t2 of the thin portion p2 is preferably smaller than thickness t0 of the attachment portion AP. In the case where thickness t2 of the thin portion p2 is smaller than thickness t0 of the attachment portion AP, the handle 20 is more lightweight.

As understood from the above, the balance of the rigidity of the handle 20 and the weight of the ends thereof is considered to influence the sense of operation. The ratio of the weight of the overlapping regions GP1a and GP2a with respect to the total weight of the handle pipe 22 may be set to a predetermined range, so that a preferred sense of operation is provided with certainty. The studies made by the present inventors have found it preferable to provide that the thin portion p2 in each of the first overlapping region GP1a and the second overlapping region GP2a is such that the weight (mass) of each of the first overlapping region GP1a and the second overlapping region GP2a is 12% or less of the total weight (mass) of the handle pipe 22. Table 3 below shows the results of an investigation made on the relationship between the ratio of the weight of each overlapping region with respect to the weight of the handle pipe and the sense of operation. Table 3 shows the ratio of the weight of each overlapping region with respect to the weight of the handle pipe (weight ratio) and the evaluation results on the sense of operation regarding each of the example and comparative examples 1 through 9, on which the studies were made. Regarding the sense of operation, "○" indicates that the sense of operation is preferred, and "X" indicates that the sense of operation is not preferred. Table 3 also shows the weight of each overlapping region, the total weight of the handle pipe, and the thickness of each of the attachment portion and the grip portions (overlapping regions and non-overlapping regions).

TABLE 3

| | WEIGHT [g] | | WEIGHT RATIO [%] | THICKNESS [mm] | | | EVALUATION RESULTS |
| --- | --- | --- | --- | --- | --- | --- | --- |
| | TOTAL | OVERLAPPING REGION | | ATTACHMENT PORTION | NON-OVERLAPPING REGION | OVERLAPPING REGION | |
| EXAMPLE | 536 | 58 | 10.8 | 3.2 | 4.3 | 3 | ○ |
| COMPARATIVE EXAMPLE 1 | 644 | 72 | 11.2 | 4 | 4 | 4 | ○ |
| COMPARATIVE EXAMPLE 2 | 564 | 72 | 12.8 | 3.2 | 4 | 4 | x |
| COMPARATIVE EXAMPLE 3 | 577 | 76 | 13.2 | 3.2 | 4.3 | 4.3 | x |
| COMPARATIVE EXAMPLE 4 | 544 | 72 | 13.2 | 3 | 4 | 4 | x |
| COMPARATIVE EXAMPLE 5 | 464 | 57 | 12.3 | 3 | 3 | 3 | x |
| COMPARATIVE EXAMPLE 6 | 504 | 57 | 11.3 | 3 | 3 | 3 | x |
| COMPARATIVE EXAMPLE 7 | 528 | 57 | 10.8 | 3.2 | 3 | 3 | x |
| COMPARATIVE EXAMPLE 8 | 555 | 57 | 10.3 | 3.4 | 3 | 3 | x |
| COMPARATIVE EXAMPLE 9 | 518 | 54 | 10.4 | 3.4 | 2.8 | 2.8 | x |

Referring to Table 3, the example is compared against comparative examples 2 through 5. It is seen from the comparison that in the case where the ratio of the weight of the overlapping region with respect to the weight of the entirety of the handle pipe is 12% or less, a preferred sense of operation is provided. In comparative examples 6 through 9, the ratio of the weight of the overlapping region with respect to the weight of the entirety of the handle pipe is 12% or less, but a preferred sense of operation is not provided. A conceivable reason for this is that the grip portions do not include a thick portion that is thicker than, or equal to, the attachment portion (comparative examples 7 through 9) or that the grip portions do not include a thin portion that is thinner than the thick portion (comparative example 6).

Figure 5A:
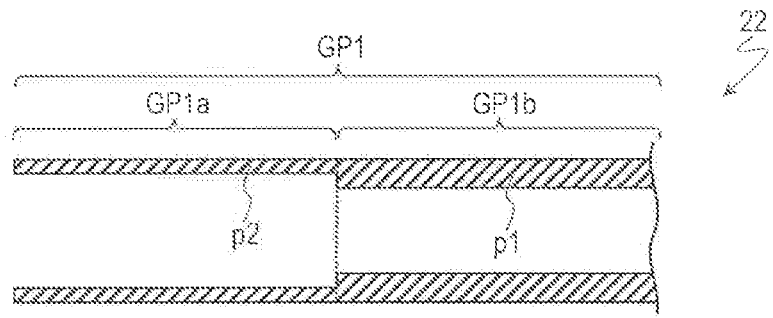
FIG. 5A and FIG. 5B are cross-sectional views showing an example of structure of the first grip portion GP1 and the second grip portion GP2 (cross sections taken along lines VA and VB in FIG. 3A).
Figure 5B:
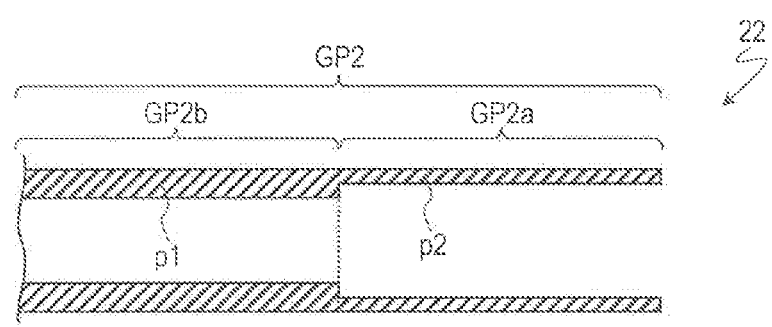

As shown in FIG. 5A and FIG. 5B, the thin portion p2 may be provided in substantially the entirety of each of the first overlapping region GP1a and the second overlapping region GP2a. In the case where the thin portion p2 is provided in substantially the entirety of each of the first overlapping region GP1a and the second overlapping region GP2a, a sufficient effect of reducing the weight of the handle pipe 22 is more easily provided. A border (stepped portion) between the thick portion p1 and the thin portion p2 may have a rounded corner in the cross-section or may not have a rounded corner in the cross-section as shown in FIG. 5A and FIG. 5B.

Figure 6A:
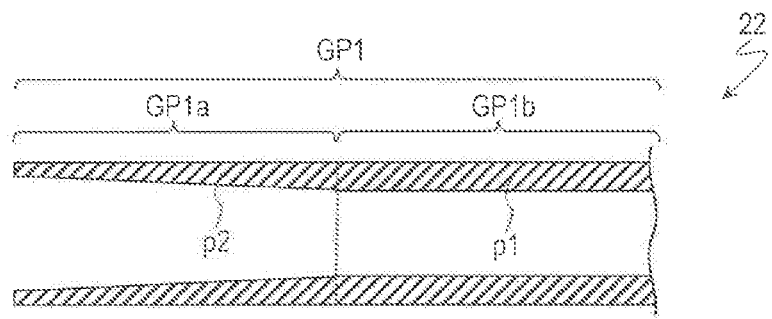
FIG. 6A and FIG. 6B are cross-sectional views showing an example of structure of the first grip portion GP1 and the second grip portion GP2 (cross sections taken along lines VIA and VIB in FIG. 3A).
Figure 6B:
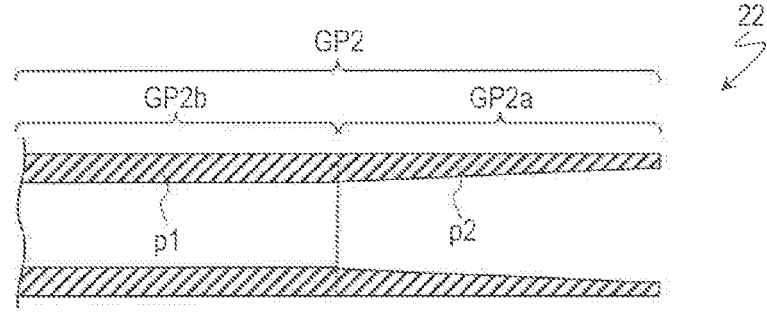

FIG. 5A and FIG. 5B show a structure in which the thin portions p2 each have substantially the same thickness in the longitudinal direction of the handle pipe 22, and the thickness is symmetrical with respect to the central axis. The handle pipe 22 is not limited to having such a structure. As shown in FIG. 6A and FIG. 6B, the thickness of the thin portions p2 may change in the longitudinal direction of the handle pipe 22. In the example shown in FIG. 6A and FIG. 6B, the thickness of each thin portion p2 decreases from the inner side (closer to the bent portion adjacent to the grip portion) toward the outer side.

Figure 7A:
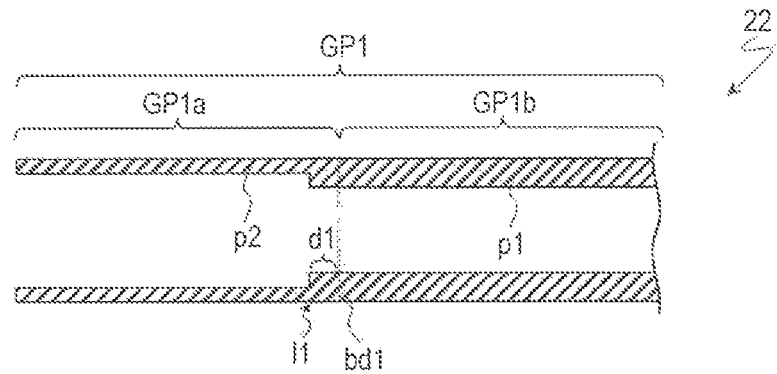
FIG. 7A and FIG. 7B are cross-sectional views showing an example of structure of the first grip portion GP1 and the second grip portion GP2 (cross sections taken along lines VIIA and VIIB in FIG. 3A).
Figure 7B:
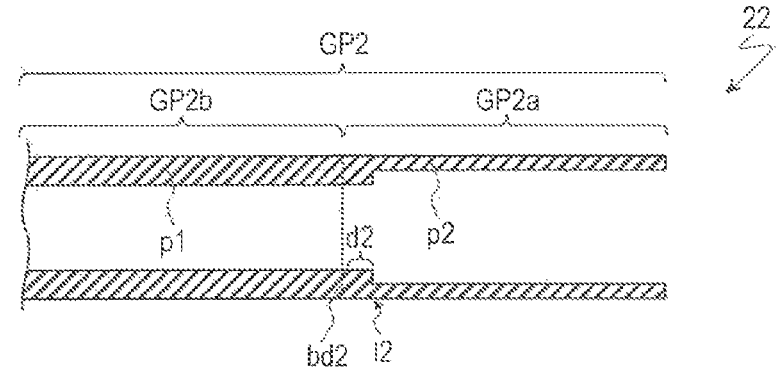

As shown in FIG. 7A and FIG. 7B, the first overlapping region GP1a and the second overlapping region GP2a may each include a portion that is not the thin portion p2 (e.g., portion that is as thick as the thick portion p1). In the structure shown in FIG. 7A, the thin portion p2 in the first overlapping region GP1a is provided from the end of the first grip portion GP1 (end opposite to the first bent portion BP1) to a predetermined position (first position) I1. In the structure shown in FIG. 7B, the thin portion p2 in the second overlapping region GP2a is provided from the end of the second grip portion GP2 (end opposite to the second bent portion BP2) to a predetermined position (second position) I2. From the point of view of providing a sufficient effect of reducing the weight of the handle pipe 22, it is preferred that the thin portion p2 is as large as possible in each of the first overlapping region GP1 and the second overlapping region GP2. Border bd1 between the first overlapping region GP1a and the first non-overlapping region GP1b in the first grip portion GP1 will be referred to as a "first border", and border bd2 between the second overlapping region GP2a and the second non-overlapping region GP2b in the second grip portion GP2 will be referred to as a "second border". From the point of view of reducing the weight of the handle pipe 22, it is preferred that distance d1 between the first position I1 and the first border bd1, and distance d2 between the second position I2 and the second border bd2, are each 30 mm or less.

Figure 8A:
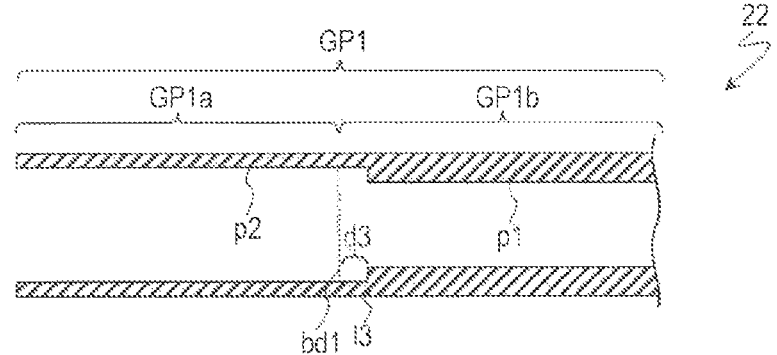
FIG. 8A and FIG. 8B are cross-sectional views showing an example of structure of the first grip portion GP1 and the second grip portion GP2 (cross sections taken along lines VIIIA and VIIIB in FIG. 3A).
Figure 8B:
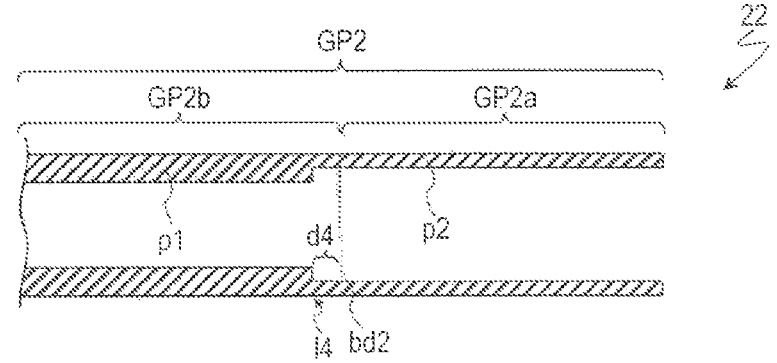

As shown in FIG. 8A and FIG. 8B, the thin portion p2 may be provided to extend into each of the first non-overlapping region GP1b and the second non-overlapping region GP2b. In the structure shown in FIG. 8A, the thin portion p2 is provided from the end of the first grip portion GP1 (end opposite to the first bent portion BP1) to a predetermined position (third position) I3 in the first non-overlapping region GP1b. In the structure shown in FIG. 8B, the thin portion p2 is provided from the end of the second grip portion GP2 (end opposite to the second bent portion BP2) to a predetermined position (fourth position) I4 in the second non-overlapping region GP2b. From the point of view of rigidity, it is preferred that distance d3 between the third position I3 and the first border bd1, and distance d4 between the fourth position I4 and the second border bd2, are each 30 mm or less.

As shown in FIG. 9A and FIG. 9B, the thickness of each of the grip portions GP1 and GP2 may not be smallest at the outer end (end not connected with the bent portion). In the structure shown in FIG. 9A, the first overlapping region GP1a includes a portion p3, which is not the thin portion p2 (i.e., which does not have a thickness smaller than that of the thick portion p1), at the outer end thereof. The portion p3 has an outer diameter smaller than an outer diameter of the thin portion p2. In the structure shown in FIG. 9B, the second overlapping region GP2a includes a portion p3, which is not the thin portion p2 (i.e., which does not have a thickness smaller than that of the thick portion p1), at the outer end thereof. The portion p3 has an outer diameter smaller than the outer diameter of the thin portion p2. As described above, the first overlapping region GP1a and the second overlapping region GP2a may each include the thin portion p2 in at least a part thereof.

Figure 10A:
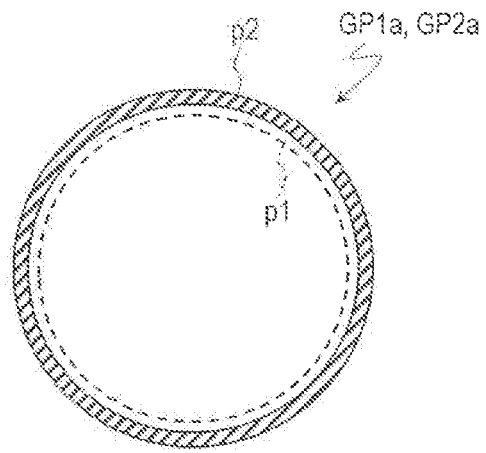
FIG. 10A, FIG. 10B and FIG. 10C each show an example of shapes of a first overlapping region GP1*a* and a second overlapping region GP2*a* in a cross-section perpendicular to the longitudinal direction of the handle pipe 22 (cross sections taken along lines XA, XB and XC in FIG. 3C).
Figure 10B:
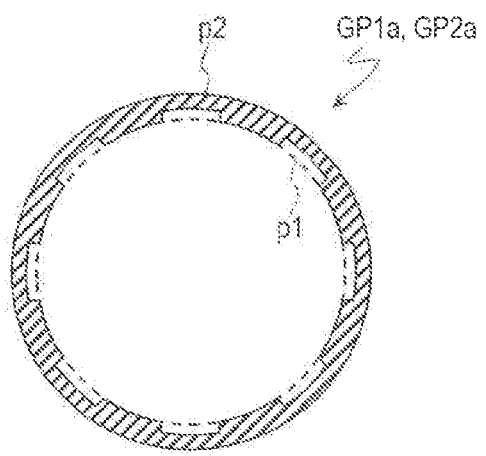
Figure 10C:
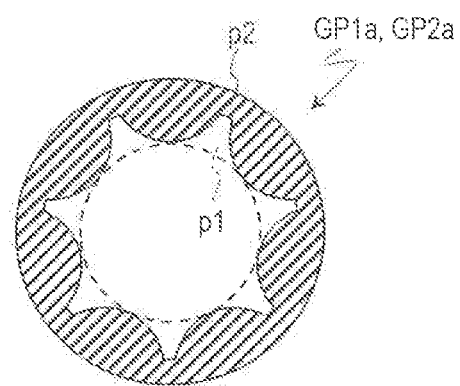

FIG. 10A, FIG. 10B and FIG. 10C each show an example of shape of the overlapping regions GP1a and GP2a in a cross-section perpendicular to the longitudinal direction of the handle pipe 22. In FIG. 10A, FIG. 10B and FIG. 10C, the thick portions p1 in the non-overlapping regions GP1b and GP2b are represented by the dashed line.

In the example shown in FIG. 10A, the thickness of the thin portion p2 is smaller than the thickness of the thick portion p2 in the entirety of the circumferential direction of the handle pipe 22. In the case where the handle pipe 22 is thinned in the entirety of the circumferential direction, the effect of reducing the weight of the handle 20 is higher than in the case where the handle pipe 22 is thinned partially in the circumferential direction.

In each of the examples shown in FIG. 10B and FIG. 10C, the thickness of the thin portion p2 is smaller than the thickness of the thick portion p1 partially in the circumferential direction. In the example shown in FIG. 10B, portions having a small thickness and portions having a large thickness (portions as thick as the thick portion p1) are alternately located in the circumferential direction. In the example shown in FIG. 10C, the thickness of the thin portion p2 is continuously increased and decreased in repetition in the circumferential direction. An inner circumferential surface has a spline-curve profile. Such a structure in which the thickness is decreased partially in the circumferential direction has an advantage that the flexural rigidity of the first grip portion GP1 and the second grip portion GP2 is easily adjusted.

Conventionally, a structure in which a weight member is attached to a grip portion of a handle of a motorcycle in order to decrease the vibration is known. The handle 20 in this embodiment does not need to include an attached weight member to be located in the first grip portion GP1 or the second grip portion GP2.

The handle pipe 22 may be preferably formed of a non-iron metal material such as an aluminum alloy, a magnesium alloy or the like. An embodiment according to the present invention has significance in the case where the handle pipe 22 is formed of a non-iron metal material. In the case where the handle pipe 22 is formed of an iron-based material such as steel or the like, it is difficult to reduce the weight of the handle 20 by decreasing the thickness because the handle pipe 22 formed of an iron-based material is already thin. In the case where the handle pipe 22 is formed of a composite material, it is very costly and requires a huge amount of energy to produce the handle pipe 22. By contrast, in the case where the handle pipe 22 is formed of a non-iron metal material, the handle pipe 22 may need to be entirely thick in order to have a requisite level of rigidity under the restrictions on the shape required by the posture of the rider riding the motorcycle 1. In an embodiment according to the present invention, the relatively large thickness is well utilized (more specifically, the thin portion p2 is selectively formed as described above), so that the requisite level of rigidity is satisfied while the fatigue of the rider is alleviated.

Figure 11:
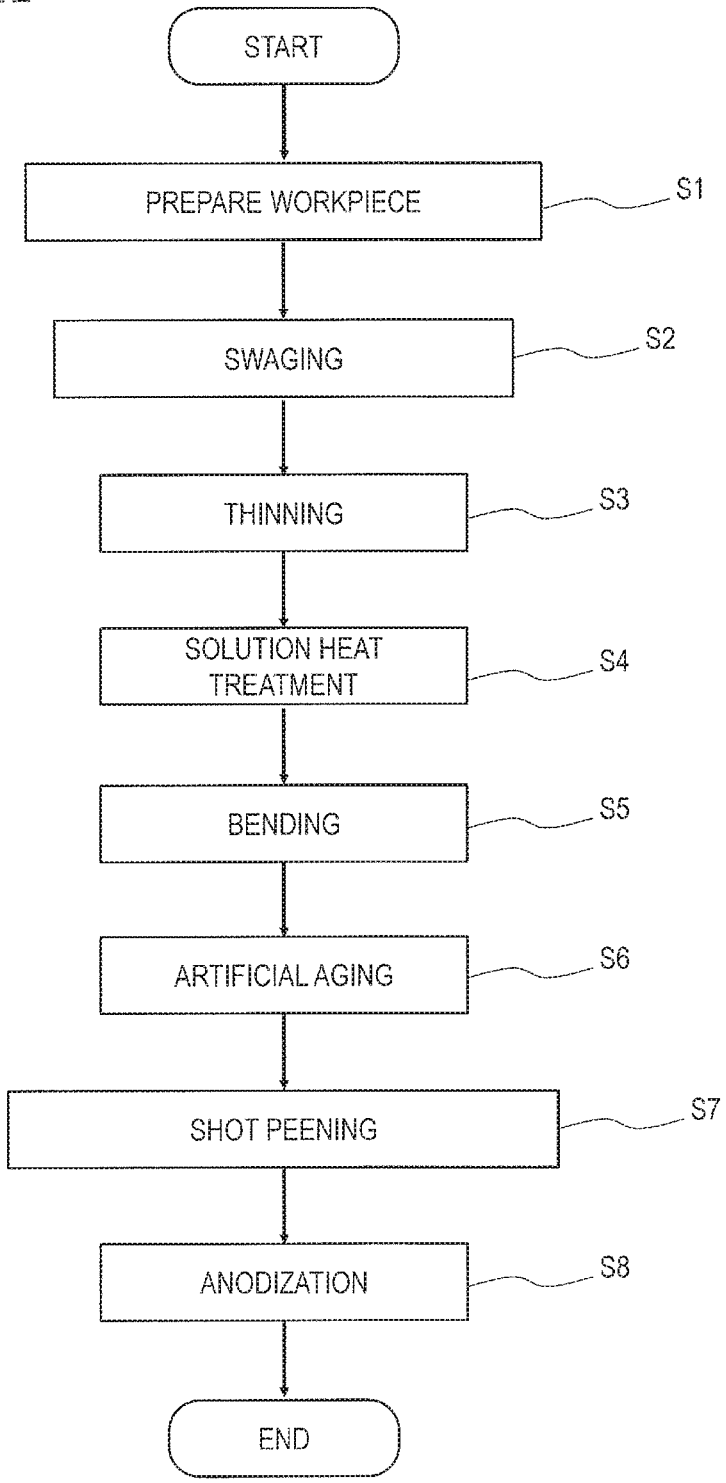
FIG. 11 is a flowchart showing a method for producing the handle pipe 22.

Now, with reference to FIG. 11, a method for producing the handle pipe 22 in this embodiment will be described. FIG. 11 is a flowchart showing an example of method for producing the handle pipe 22.

First, a tube-like workpiece is prepared (step S1). In this step, a workpiece formed of an aluminum alloy is prepared. For example, a workpiece processed with hydrostatic pressure extrusion (hydrostatic pressure-extruded member) is prepared, and the prepared workpiece is processed with drawing. The "hydrostatic pressure extrusion" is a type of extrusion molding. According to the hydrostatic pressure extrusion, a billet is not extruded directly, but is extruded via a liquid (fluid) having an appropriate level of viscosity. As a workpiece, an extruded member other than the hydrostatic pressure-extruded member (e.g., member formed by direct extrusion or indirect extrusion), or a drawn member may be used. The drawn member has a high size precision. An extruded member used as a workpiece has a uniform thickness. The above-described hydrostatic pressure-extruded member used as a workpiece has a higher strength than a general extruded member. In the case where the hydrostatic pressure-extruded member is processed with drawing, the resultant workpiece has a still higher size precision. Such a workpiece has little change in the section modulus and is deformed more uniformly. The workpiece prepared in this step (after being processed with the drawing) has a constant outer diameter and a constant inner diameter (i.e., constant thickness) in the entirety thereof. A preferably usable example of aluminum alloy may be Al—Mg-Zu-Cu-based aluminum alloy.

Next, the workpiece is processed such that regions of the workpiece that are to be the first grip portion GP1 and the second grip portion GP2 have an outer diameter smaller than an outer diameter of a region that is to be the attachment portion AP (diameter contraction). In this step, swaging is performed (step S2). The diameter contraction (raising) may be performed by a method other than swaging (e.g., by spinning).

Then, the regions of the workpiece that are to be the first grip portion GP1 and the second grip portion GP2 are partially thinned (step S3). The thinning step may be preferably performed by, for example, machining (e.g., cutting).

Next, the workpiece is processed with solution heat treatment (step S4). The temperature and the time duration of the solution heat treatment are set in accordance with the composition of the aluminum alloy. For example, the solution heat treatment is performed at 470 to 480° C. for 1 to 3 hours.

Then, the workpiece is bent (step S5). As a result of the bending, the first bent portion BP1 and the second bent portion BP2 are formed.

Next, the workpiece is processed with artificial aging (step S6). For example, the artificial aging is performed at 115 to 125° C. for 3 to 6 hours and then at 170 to 180° C. for 6 to 12 hours. The solution heat treatment and the artificial aging may be collectively referred to as a "T7 heat treatment". In this embodiment, the bending is performed between the solution heat treatment and the artificial aging in the T7 heat treatment.

Next, the workpiece is processed with shot peening (step S7). The shot peening is performed in order to improve the fatigue strength.

Then, the workpiece is anodized (step S8). The anodization is a step of forming an anodized film on a surface of the aluminum alloy.

As a result, the handle pipe 22 is formed. The method for producing the handle pipe 22 in this embodiment provides an effect that the first bent portion BP1 and the second bent portion BP2 have a low level of flattening. Hereinafter, a reason for this will be described.

Figure 12:
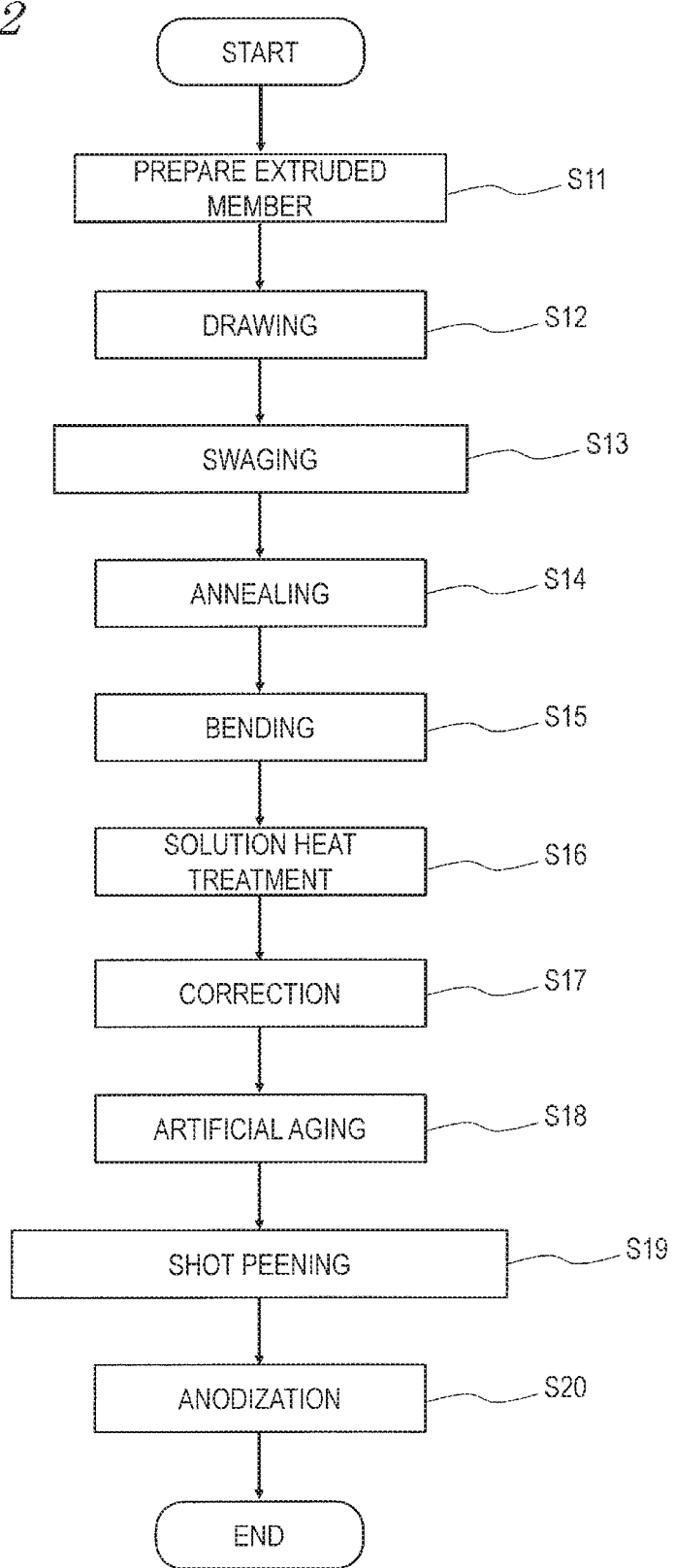
FIG. 12 is a flowchart showing a method for producing a handle pipe in a reference example.

FIG. 12 is a flowchart showing a method for producing a handle pipe in a reference example. According to the method in the reference example, the handle pipe is produced as follows. First, an extruded member is prepared as a workpiece (step S11), and then, the workpiece is processed with drawing (step S12).

Next, the workpiece is swaged (step S13), and then is annealed in order to be softened (step S14).

Next, the workpiece is bent (step S15), and then is processed with solution heat treatment (step S16). Then, the workpiece is corrected (step S17).

Next, the workpiece is sequentially processed with artificial aging (step S18), shot peening (step S19) and anodization (step S20).

According to the method in the reference example, the workpiece is processed with the solution heat treatment (step S16) after being bent (step S15). Therefore, after being molded into a product shape, the workpiece is kept at a high temperature and then is rapidly cooled. Thus, the workpiece is significantly deformed by the heat treatment. This requires the workpiece to be corrected (step S17) after being processed with the solution heat treatment.

By contrast, according to the method in this embodiment, the workpiece is processed with the solution heat treatment (step S4) before being bent (step S5). Therefore, the workpiece does not need to be corrected. In addition, the workpiece is bent after becoming hard to a certain degree by the solution heat treatment. Therefore, the cross-sectional shape of the first bent portion BP1 and the second bent portion BP2 is not easily changed. This allows the flattening of the first bent portion BP1 and the second bent portion BP2 to be low. The "flattening" is defined as (maximum diameter−minimum diameter)×100/average diameter. In the case where the flattening is high, the rigidity difference, which depends on the load direction, is increased. From the point of view of uniformizing the rigidity, it is preferred that the flattening of each of the first bent portion BP1 and the second bent portion BP2 is low. Specifically, it is preferred that the first bent portion BP1 and the second bent portion BP2 each have a flattening of 5% or less in a central portion thereof. Also according to the method in this embodiment, the annealing is not necessary. This decreases the time and energy for the production of the handle pipe 22.

Figure 13:
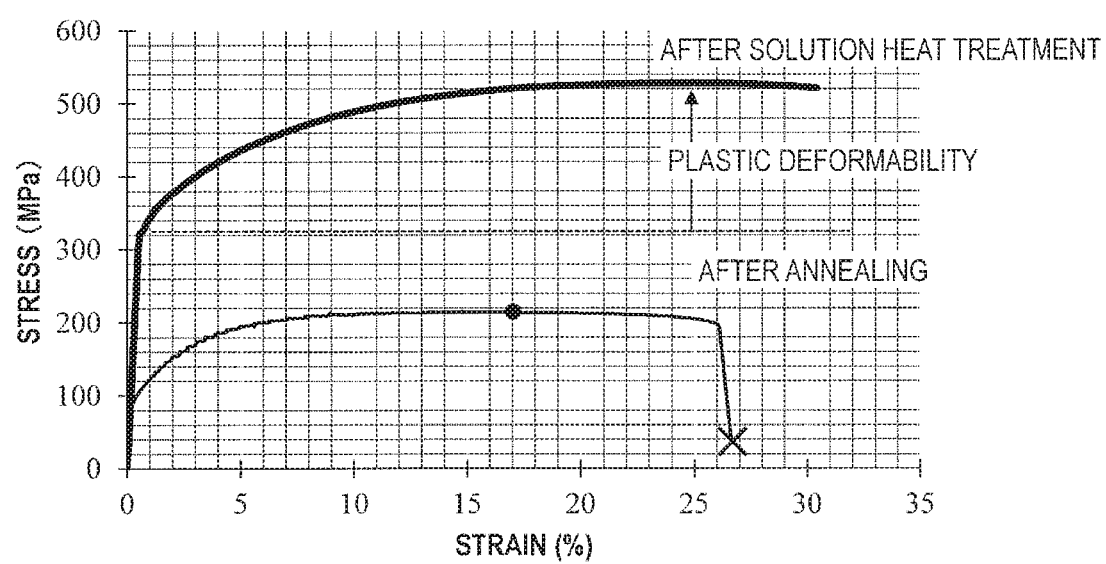
FIG. 13 is a graph showing an example of stress-strain curve of a workpiece formed of an aluminum alloy after the workpiece is annealed and after the workpiece is processed with solution heat treatment.

Even after being processed with the solution heat treatment, the workpiece is bent with no problem for the following reason. The workpiece, even though becoming hard to a certain degree by the solution heat treatment, may have a sufficient level of plastic deformability. FIG. 13 shows an example of stress-strain curve of a workpiece formed of an aluminum alloy after the workpiece is annealed and after the workpiece is processed with the solution heat treatment. It is seen from FIG. 13 that even after the workpiece is processed with the solution heat treatment, the yield ratio, which is obtained by division of the yield point by the tensile strength, is low. This shows that the workpiece has a sufficient level of plastic deformability.

As shown in FIG. 11, it is preferred to prepare the workpiece produced by hydrostatic pressure extrusion (hydrostatic pressure-extruded member). A reason for this is that the hydrostatic pressure-extruded member has a higher strength than that of a general extruded member, and thus may be thinned to be still more lightweight.

In the example shown in FIG. 11, the thinning is performed between the swaging and the solution heat treatment. The timing at which the workpiece is thinned is not limited to such a timing. The thinning may be performed between the artificial aging and the shot peening, between the shot peening and the anodization, or after the anodization.

At the time of swaging, the regions to be the overlapping regions GP1*a* and GP2*a* may be made thinner than the regions to be the non-overlapping regions GP1*b* and GP2*b*. Namely, the thinning may be performed at the same time with the swaging. For example, a stepped core bar including a portion having a relatively large outer diameter (large-diameter portion) and a portion having a relatively small outer diameter (small-diameter portion) is prepared, and the swaging is performed such that inner circumferential surfaces of the portions of the workpiece that are to be the grip portions GP1 and GP2 contact the stepped core bar. In this manner, the thick portion p1 is formed around the small-diameter portion, and the thin portion p2 is formed around the large-diameter portion.

An embodiment according to the present invention is preferably applicable to a handle in which the attachment portion AP of the handle pipe 22 has the outer diameter larger than the outer diameter of the grip portions GP1 and GP2 (so-called tapered handle). In the case where a handle pipe for such a tapered handle is produced by, for example, swaging, the thickness of the handle pipe becomes larger from the central portion (attachment portion) toward the ends. This easily increases the weight of the handle pipe. In an embodiment according to the present invention, the first grip portion GP1 and the second grip portion GP2 of the handle pipe 22 each include the thin portion p2. This preferably realizes a lightweight tapered handle.

An embodiment according to the present invention is not limited to being applicable to a tapered handle. Namely, an embodiment according to the present invention is applicable to a handle in which the outer diameter of the grip portions GP1 and GP2 is the same as the outer diameter of the attachment portion AP.

The above-described description is regarding a motorcycle as an example of straddled vehicle. The straddled vehicle is not limited to the motorcycle. The handle in an embodiment according to the present invention is preferably applicable to any of various straddled vehicles including a bicycle, a snow mobile, an ATV (All Terrain Vehicle), a personal water craft and the like. In the case of being applied to such a vehicle, the handle in an embodiment according to the present invention is preferably usable for a steering device capable of changing the advancing direction of the straddled vehicle.

As described above, in the handle 20 for a straddled vehicle in an embodiment according to the present invention, the first grip portion GP1 and the second grip portion GP2 of the handle pipe 22 each include the thick portion p1 having thickness t1 larger than, or equal to, thickness t0 of the attachment portion AP and the thin portion p2 having thickness t2 smaller than thickness t1 of the thick portion p1. Specifically, the thick portion p1 is provided in the first non-overlapping region GP1b (portion not overlapping the first handle grip 21A) of the first grip portion GP1 and in the second non-overlapping region GP2b (portion not overlapping the second handle grip 21B) of the second grip portion GP2. Specifically, the thin portion p2 is provided in the first overlapping region GP1a (portion overlapping the first handle grip 21A) of the first grip portion GP1 and in the second overlapping region GP2a (portion overlapping the second handle grip 21B) of the second grip portion GP2. The first grip portion GP1 and the second grip portion GP2 each include the thick portion p1, and thus the handle 20 has a sense of sufficient rigidity with certainty. The first grip portion GP1 and the second grip portion GP2 each include the thin portion p2, and thus the handle 20 is more lightweight than in the case where, for example, the first grip portion GP1 and the second grip portion GP2 are each entirely the thick portion p1. The thick portion p1 is provided in a relatively inner region of each of the first grip portion GP1 and the second grip portion GP2 (first non-overlapping region GP1b and the second non-overlapping region GP2b), and the thin portion p2 is provided in a relatively outer region of each of the first grip portion GP1 and the second grip portion GP2 (first overlapping region GP1a and the second overlapping region GP2a). Thus, the sense of being pushed up is decreased. This reduces the fatigue of the rider. As described above, an embodiment according to the present invention reduces the weight of the handle 20 for a straddled vehicle and also alleviates the fatigue of the rider.

In the case where thickness t2 of the thin portion p2 is smaller than thickness t0 of the attachment portion AP, the handle 20 is more lightweight.

From the point of view of providing a sufficient effect of reducing the weight of the handle 20 and the point of view of decreasing the sense of being pushed up with more certainty, it is preferred that the thin portions p2 are provided such that the mass of each of the first overlapping region GP1a of the first grip portion GP1 and the second overlapping region GP2a of the second grip portion GP2 is 12% or less of the entire mass of the handle pipe 22.

From the point of view of reducing the weight of the handle 20, it is preferred that the thin portion p2 is as large as possible in each of the first overlapping region GP1a and the second overlapping region GP2a. For example, the thin portion p2 in the first overlapping region GP1a may be provided from the end of the first grip portion GP1 (end opposite to the first bent portion BP1) to the predetermined position (first position) I1. The thin portion p2 in the second overlapping region GP2a may be provided from the end of the second grip portion GP2 (end opposite to the second first bent portion BP2) to the predetermined position (second position) I2. Where border bd1 between the first overlapping region GP1a and the first non-overlapping region GP1b in the first grip portion GP1 is referred to as the "first border", and border bd2 between the second overlapping region GP2a and the second non-overlapping region GP2b in the second grip portion GP2 is referred to as the "second border", it is preferred that distance d1 between the first position I1 and the first border bd1, and distance d2 between the second position I2 and the second border bd2, are each 30 mm or less.

In the case where the thin portion p2 is provided in substantially the entirety of each of the first overlapping region GP1a and the second overlapping region GP2a, the sufficient effect of reducing the weight is more easily provided.

In the case where the thickness of the thin portion p2 is smaller than the thickness of the thick portion p1 in the entirety of the circumferential direction of the handle pipe 22 (namely, the handle pipe 22 is thinned in the entirety of the circumferential direction thereof), the effect of reducing the weight is higher than in the case where the handle pipe 22 is thinned partially in the circumferential direction.

In the case where the thickness of the thin portion p2 is smaller than the thickness of the thick portion p1 partially in the circumferential direction, the flexural rigidity of the first grip portion GP1 and the second grip portion GP2 is easily adjusted.

The thickness of each thin portion p2 may be substantially the same in the longitudinal direction of the handle pipe 22 and may be symmetrical, or may change in the longitudinal direction of the handle pipe 22.

The handle 20 for a straddled vehicle in an embodiment according to the present invention does not need to include a weight member in the first grip portion GP1 or the second grip portion GP2.

An embodiment according to the present invention has significance in the case where the handle pipe 22 is formed of a non-iron metal material. The reason is as follows. In the case where the handle pipe 22 is formed of an iron-based material such as steel or the like, it is difficult to reduce the weight of the handle pipe 22 by decreasing the thickness because the handle pipe 22 formed of an iron-based material is already thin. By contrast, in the case where the handle pipe 22 is formed of a non-iron metal material, the handle pipe 22 may need to be entirely thick in order to have a requisite level of rigidity under the restrictions on the shape required by the posture of the rider riding the motorcycle 1. In an embodiment according to the present invention, the relatively large thickness is well utilized (more specifically, the thin portion p2 is selectively formed as described above), so that the requisite level of rigidity is satisfied while the fatigue of the rider is alleviated.

An embodiment according to the present invention is preferably applicable to a handle in which outer diameter od1 of the attachment portion AP of the handle pipe 22 is larger than outer diameter od2 of each of the first grip portion GP1 and the second grip portion GP2 (so-called tapered handle). In the case where a handle pipe for such a tapered handle is produced by, for example, swaging, the thickness of the handle pipe becomes larger from the central portion (attachment portion) toward the ends. This easily increases the weight of the handle pipe. In an embodiment according to the present invention, the first grip portion GP1 and the second grip portion GP2 of the handle pipe 22 each include the thin portion p2. This preferably realizes a lightweight tapered handle.

From the point of view of uniformizing the rigidity, it is preferred that the flattening of each of the first bent portion BP1 and the second bent portion BP2 is low. Specifically, it is preferred that the first bent portion BP1 and the second bent portion BP2 each have a flattening of 5% or less in the central portion thereof.

According to the method in an embodiment of the present invention, the solution heat treatment is performed before the bending. In the case where the solution heat treatment is performed after the bending, the workpiece is kept at a high temperature and then is rapidly cooled after being molded into a product shape. Thus, the workpiece is significantly deformed by the heat treatment. This requires the workpiece to be corrected after being processed with the solution heat treatment. By contrast, in an embodiment according to the present invention, the solution heat treatment is performed before the bending. Therefore, the workpiece does not need to be corrected. In addition, the workpiece is bent after becoming hard to a certain degree by the solution heat treatment. Therefore, the cross-sectional shape of the first bent portion BP1 and the second bent portion BP2 is not easily changed. This allows the flattening of the first bent portion BP1 and the second bent portion BP2 to be low.

The prepared workpiece is preferably a workpiece produced by extrusion (extruded member), and is more preferably a workpiece produced by hydrostatic pressure extrusion (hydrostatic pressure-extruded member). The extruded member has a highly uniform thickness. The hydrostatic pressure-extruded member has a higher strength than that of a general extruded member.

The regions of the workpiece to be the first grip portion GP1 and the second grip portion GP2 may partially be thinned. In the case where the first grip portion GP1 and the second grip portion GP2 each include the thick portion p1 having thickness t1 larger than, or equal to, thickness t0 of the attachment portion AP and the thin portion p2 having thickness t2 smaller than thickness t1 of the thick portion p1, the handle 20 is reduced in weight and the fatigue of the rider is reduced.

The step of partially thinning the regions to be the first grip portion GP1 and the second grip portion GP2 may be preferably performed by, for example, machining.

The method for producing the handle 20 in an embodiment according to the present invention includes a step of processing the workpiece such that the outer diameter of the regions of the workpiece to be the first grip portion GP1 and the second grip portion GP2 is smaller than the outer diameter of the region of the workpiece to be the attachment portion AP (diameter contraction step). The diameter contraction step may be preferably performed by, for example, swaging. In such a case, the regions to be the first grip portion GP1 and the second grip portion GP2 may partially be thinned in the diameter contraction step.

An embodiment according to the present invention reduces the weight of the handle for a straddled vehicle and also alleviates the fatigue of the rider. A handle for a straddled vehicle in an embodiment according to the present invention is preferably usable for any of various straddled vehicles.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method for producing a handle pipe for a straddled vehicle, the handle pipe including:
   an attachment portion located in a central portion in a longitudinal direction, the attachment portion being attachable to a steering rotation device;
   a first grip portion located at one of two ends of the handle pipe in the longitudinal direction;
   a second grip portion located at another of the two ends of the handle pipe in the longitudinal direction;
   a first bent portion located between the attachment portion and the first grip portion, the first bent portion extending from one of two ends of the attachment portion to one of two ends of the first grip portion, the first bent portion extending in a direction different from a direction in which the attachment portion extends; and
   a second bent portion located between the attachment portion and the second grip portion, the second bent portion extending from another end of the two ends of the attachment portion to one of two ends of the second grip portion, the second bent portion extending in a direction different from the direction in which the attachment portion extends;
   the method comprising:
   a step (A) of preparing a workpiece having a tubular shape and being formed of a metal material;
   a step (B) of processing the workpiece such that an outer diameter of each of regions of the workpiece to be the first grip portion and the second grip portion is smaller than an outer diameter of the workpiece to be the attachment portion;
   a step (C) of processing the workpiece with solution heat treatment after the step (B); and
   a step (D) of bending the workpiece after the step (C).

2. The method for producing a handle pipe for a straddled vehicle according to claim 1, wherein the workpiece prepared in the step (A) is produced by extrusion.

3. The method for producing a handle pipe for a straddled vehicle according to claim 1, further comprising a step (E) of partially thinning the workpiece to form the first grip portion and the second grip portion;

wherein the first grip portion and the second grip portion each include a thick portion having a thickness larger than, or equal to, a thickness of the attachment portion and a thin portion having a thickness smaller than the thickness of the thick portion.

4. The method for producing a handle pipe for a straddled vehicle according to claim 3, wherein the step (E) is performed by machining after the step (B).

5. The method for producing a handle pipe for a straddled vehicle according to claim 3, wherein:
   the step (B) is performed by swaging; and
   the step (E) is performed in the step (B).

* * * * *